(12) United States Patent
Koike (10) Patent No.: US 6,694,813 B2
(45) Date of Patent: Feb. 24, 2004

(54) VIBRATING GYROSCOPE AND ELECTRONIC UNIT USING THE SAME

(75) Inventor: Masato Koike, Toyama-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/119,698

(22) Filed: Apr. 11, 2002

(65) Prior Publication Data

US 2002/0166380 A1 Nov. 14, 2002

(30) Foreign Application Priority Data

May 9, 2001 (JP) ........................................ 2001-139108
Dec. 14, 2001 (JP) ........................................ 2001-382085

(51) Int. Cl.[7] .................... G01C 19/00; G01P 15/08; G01P 3/44; G01P 9/00
(52) U.S. Cl. ................................. 73/504.14; 73/504.12
(58) Field of Search ...................... 73/504.12, 504.14, 73/504.15, 504.16, 504.03, 504.04, 504.02; 310/331, 329, 368

(56) References Cited

U.S. PATENT DOCUMENTS

| | | | | |
|---|---|---|---|---|
| 5,635,641 A | * | 6/1997 | Kakehi et al. | ........... 73/504.14 |
| 5,635,647 A | * | 6/1997 | Heinouchi | .................... 73/662 |
| 5,794,080 A | * | 8/1998 | Watanabe et al. | ............. 396/53 |
| 5,874,674 A | * | 2/1999 | Kasanami et al. | ........ 73/504.14 |
| 5,895,999 A | * | 4/1999 | Okaguchi et al. | ........... 310/367 |
| 5,970,792 A | * | 10/1999 | Yamamoto | ............... 73/504.14 |
| 6,023,973 A | * | 2/2000 | Yabe et al. | ............... 73/504.12 |
| 6,532,816 B2 | * | 3/2003 | Fujimoto | ................. 73/504.14 |

FOREIGN PATENT DOCUMENTS

| | | | |
|---|---|---|---|
| JP | 409159455 | * | 6/1997 |
| JP | 11-125526 | | 5/1999 |

\* cited by examiner

*Primary Examiner*—Hezron Williams
*Assistant Examiner*—Tamiko Bellamy
(74) *Attorney, Agent, or Firm*—Keating & Bennett, LLP (57) ABSTRACT

A vibrating gyroscope includes supporting members that are fixed to the vicinities of two node points of a bar-shaped vibrator. The supporting members extend from the positions at which they are fixed to the vibrator in the widthwise direction of the vibrator. The supporting members also include intermediate portions positioned on the plane (neutral plane) which is substantially parallel to first and second main surfaces of the vibrator and which passes through the approximate center of the thickness direction.

20 Claims, 4 Drawing Sheets

VIBRATING GYROSCOPE AND ELECTRONIC UNIT USING THE SAME

BACKGROUND OF THE INVENTION

1. Field of the Invention

The present invention generally relates to a vibrating gyroscope and an electronic unit including the same. More particularly, the present invention relates to a vibrating gyroscope for use in, for example, a hand-shaking correction device for use in, for example, an automobile navigation system or a video camera, and to an electronic unit including such a vibrating gyroscope.

2. Description of the Related Art

A gyroscope is used for, for example, a hand-shaking correction device for use in an automobile navigation system or a video camera. One type of such a gyroscope is a vibrating gyroscope for detecting the angular velocity applied to a vibrator by detecting distortion of a bar-shaped bending-vibrating-type vibrator caused by the Coriolis force. In the vibrating gyroscope, it is necessary to support the vibrator without interfering with the vibration of the vibrator. Japanese Unexamined Patent Application Publication No. 11-125526 discloses a structure for supporting a vibrator.

In the vibrating gyroscope disclosed in this publication, a bar-shaped vibrator having two main surfaces (first and second main surfaces) includes a pair of supporting members fixed to electrodes disposed on the first and second main surfaces, respectively, in the vicinity of two node points of double-end-free bending vibration generated by driving. The supporting members extend from the first and second main surfaces of the vibrator in the widthwise direction of the vibrator. A bending portion having a component in the longitudinal direction of the vibrator is also provided between the portion of the supporting member fixed to the electrode and the end of the supporting member.

Thus, the supporting members are arranged to avoid seriously interfering with the vibration of the vibrator, and leakage of the vibration of the vibrator to the exterior is also minimal.

However, the vibrating gyroscope disclosed in the above-identified publication suffers from the following problems. The vibration nodes of the vibrator are positioned within the vibrator. On the other hand, the supporting members are fixed on the first and second main surfaces of the vibrator, and the portions other than the portions fixed to the first and second main surfaces are also positioned in the plane extending from the first and second main surfaces. This is different from the ideal arrangement of supporting members for supporting the vibrator at the node points. Thus, the vibration and the deformation of the supporting members caused by the vibration of the vibrator become relatively large, and the vibration of the vibrator leaks to the exterior via the supporting members. This makes the vibration unstable, thereby decreasing the detection precision of the angular velocity.

Figure 6:
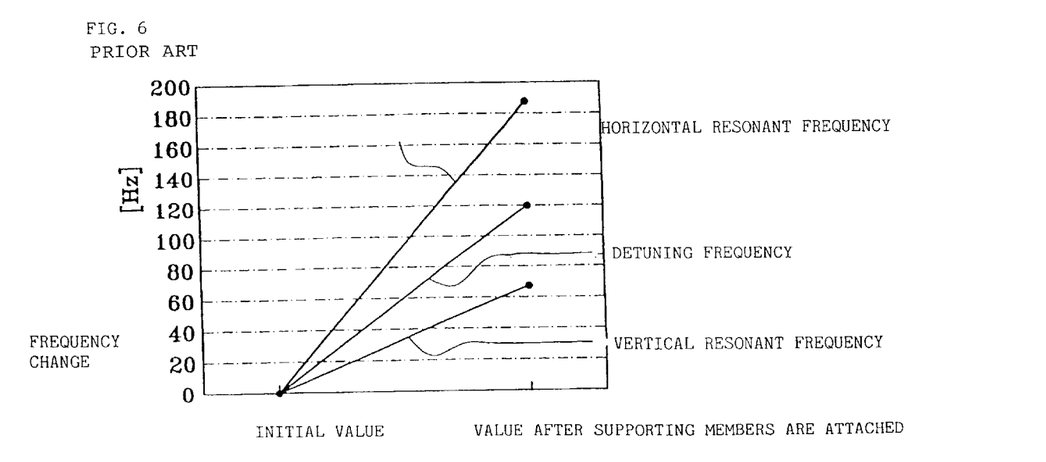
FIG. 6 is a characteristic diagram illustrating the change in resonant frequency of a vibrator for use in a known vibrating gyroscope before and after supporting members are attached.

FIG. 6 illustrates the change in resonant frequency of the vibrator in the vibrating gyroscope disclosed in the above-described publication before and after the supporting members are attached. In FIG. 6, the vertical resonant frequency indicates the resonant frequency in the vibration in the thickness direction of the vibrator, i.e., the resonant frequency in the vibration caused by driving. The horizontal resonant frequency indicates the resonant frequency in the vibration in the widthwise direction of the vibrator, i.e., the resonant frequency in the vibration caused by the Coriolis force. The detuning frequency indicates the difference between the vertical resonant frequency and the horizontal resonant frequency.

FIG. 6 shows that there is a great difference between the change in vertical resonant frequency and the change in horizontal resonant frequency before and after the supporting members are attached, and thus, the detuning frequency is considerably changed. The vertical resonant frequency and the horizontal resonant frequency of the vibrator are changed by a restraining force that is generated due to the attachment of the supporting members. Such a restraining force is canceled by external disturbances, such as mechanical impact or thermal impact, and the vertical frequency and the horizontal frequency may return to the original frequencies. Accordingly, the detuning frequency may also return to the original frequency, i.e., the detuning frequency is changed. In the vibrating gyroscope, the change in detuning frequency influences the sensitivity for detecting the Coriolis force, the temperature characteristics, and the response characteristics. Thus, if the detuning frequency is changed for some reason, for example, by attaching supporting members after completion of the vibrating gyroscope, the sensitivity, the temperature characteristics, and the response characteristics are disadvantageously changed.

SUMMARY OF THE INVENTION

In order to solve the problems described above, preferred embodiments of the present invention provide a vibrating gyroscope which achieves minimal interference with the vibration of a vibrator and which does not experience a change in the sensitivity, the temperature characteristics, and the response characteristics over time, and also the preferred embodiments provide an electronic unit including such a novel vibrating gyroscope.

According to a preferred embodiment of the present invention, a vibrating gyroscope includes a bar-shaped vibrator for performing double-end-free bending vibration in a thickness direction and in a widthwise direction thereof, and supporting members arranged to sandwich the vicinities of two node points of the vibrator from both sides of the vibrator in the thickness direction. The supporting members are arranged such that they extend from positions at which they are fixed to the vibrator in the widthwise direction of the vibrator, and also include intermediate portions positioned substantially on a plane which is parallel to the widthwise direction and the longitudinal direction of the vibrator and which passes through the approximate center of the vibrator in the thickness direction.

The supporting members may extend to both sides in the widthwise direction of the vibrator so as to define the intermediate portions.

Also, the supporting member may include at least one bending portion at the position of the intermediate portion.

The bending portions of the supporting members positioned on both sides of the vibrator in the thickness direction in the vicinity of each of the node points may bend in the opposite directions with respect to the longitudinal direction of the vibrator.

The bending portions of the supporting members positioned on one side of the vibrator in the thickness direction in the vicinities of the two node points may bend in the opposite directions with respect to the longitudinal direction of the vibrator, and the bending portions of the supporting members positioned on the other side of the vibrator in the thickness direction in the vicinities of the two node points may bend in the opposite directions with respect to the longitudinal direction of the vibrator.

The supporting members may be preferably made of a conductive material, and may be electrically and mechanically connected to electrodes disposed on the vibrator.

The vibrator may include a first main surface and a second main surface, and the electrodes may be located on the first main surface and the second main surface.

The vibrating gyroscope may further include a supporting base. In this case, the supporting members may be bent toward one side of the vibrator in the thickness direction and may be fixed on the supporting base, thereby retaining the vibrator in a space above the supporting base.

Alternatively, the vibrating gyroscope may further include an opened-box-type base having side walls and having a hollowed out portion at the center thereof. In this case, the ends of the supporting members may be fixed to the opened-box-type base, thereby retaining the vibrator in the hollowed out portion of the opened-box-type base.

According to the vibrating gyroscope of various preferred embodiments of the present invention, the vibrator can be supported by the supporting members at the node axes. Accordingly, leakage of the vibration to the exterior is reliably prevented, and the vibration becomes stable, thereby improving the detection precision of the angular velocity. Additionally, the sensitivity for detecting the Coriolis force, the temperature characteristics, and the response characteristics do not change in any meaningful way over time.

An electronic unit according to a preferred embodiment of the present invention includes a vibrating gyroscope according to the preferred embodiments described above.

According to the electronic unit of a preferred embodiment of the present invention, the performance of the electronic unit is greatly improved by using the vibrating gyroscope of the present invention.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Figure 1:
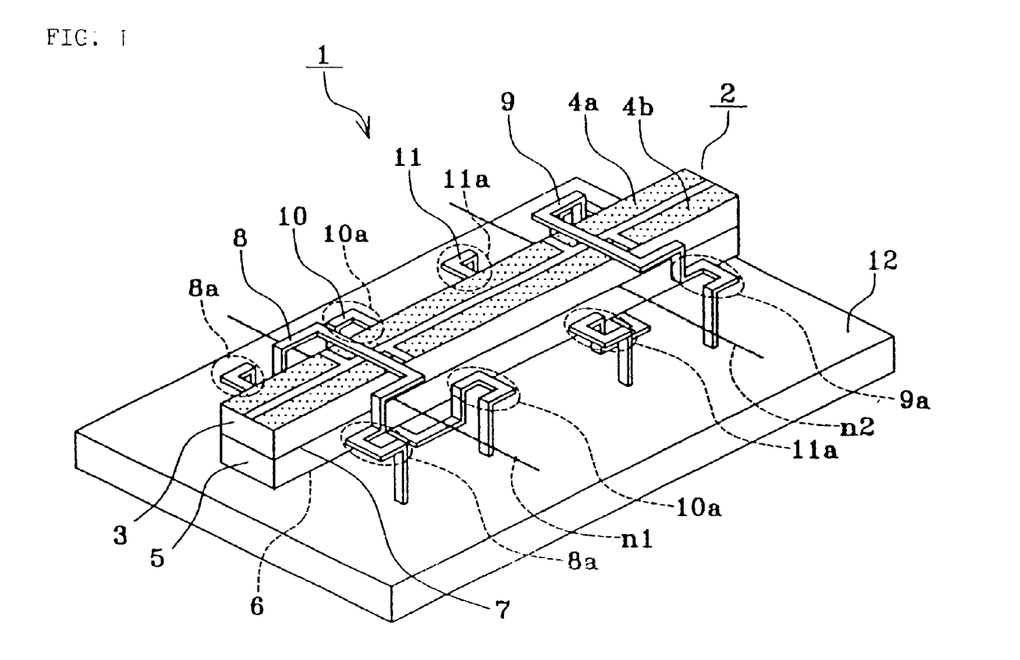
FIG. 1 is a perspective view illustrating a vibrating gyroscope according to a preferred embodiment of the present invention.
Figure 2A:
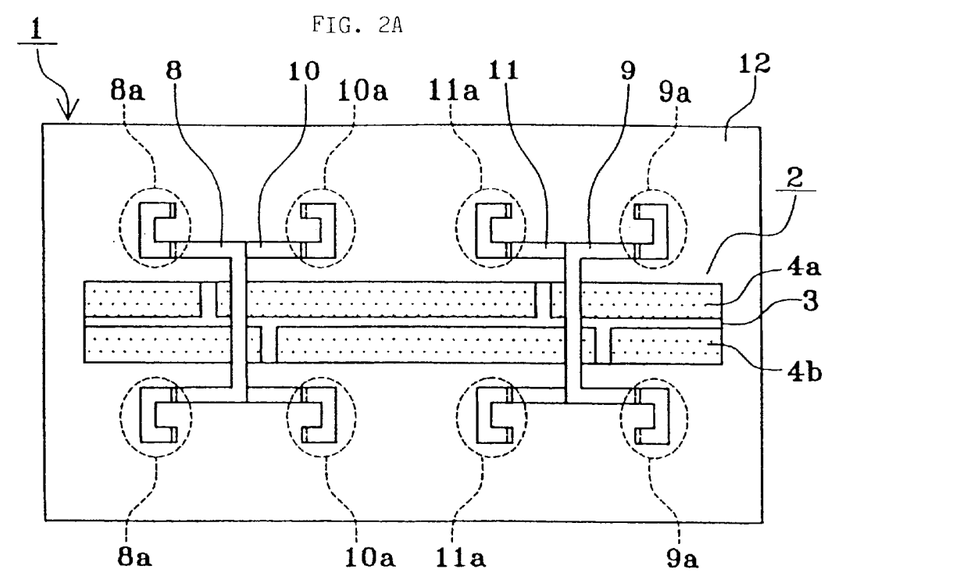
FIGS. 2A, 2B, and 2C a plan view, a side view, and a front view, respectively, of the vibrating gyroscope shown in FIG. 1.
Figure 2B:
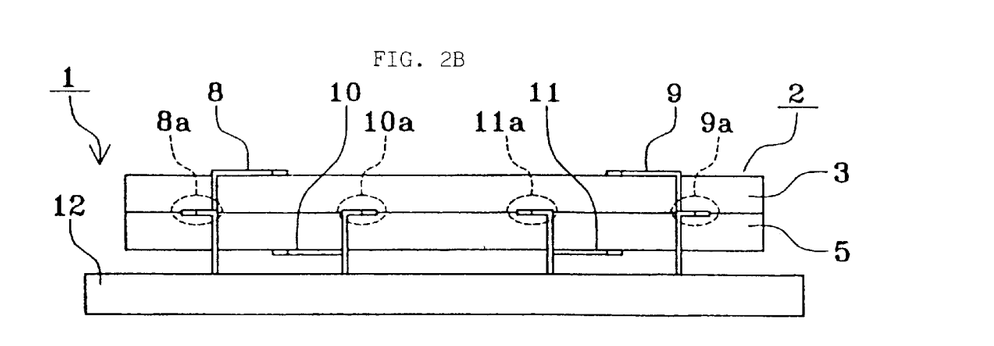
Figure 2C:
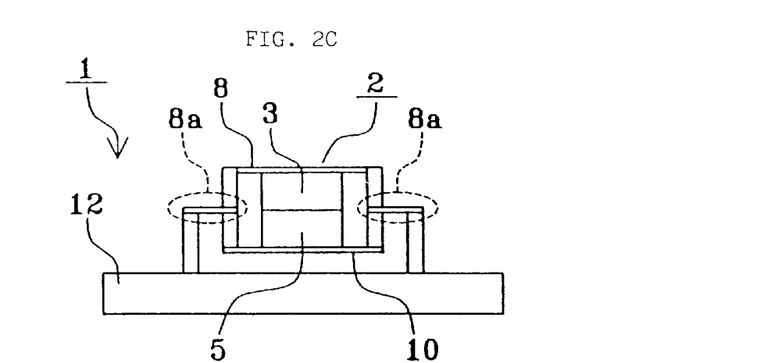

FIG. 1 is a perspective view illustrating a vibrating gyroscope constructed in accordance with a preferred embodiment of the present invention. FIGS. 2A, 2B, and 2C are a plan view, a side view, and a front view, respectively, of the vibrating gyroscope shown in FIG. 1. In FIGS. 1 through 2C, a vibrating gyroscope 1 includes a vibrator 2, planar conductive supporting members 8, 9, 10, and 11 preferably made of a metal, for example, a Fe—Ni alloy or phosphorus bronze, and a supporting base 12.

The vibrator 2 includes piezoelectric substrates 3 and 5. The piezoelectric substrate 3 is polarized in the thickness direction, and includes electrodes 4a and 4b divided in the widthwise direction and disposed on a first main surface of the piezoelectric substrate 3. The piezoelectric substrate 5 is also polarized in the thickness direction, and includes an electrode 6 on a first main surface of the piezoelectric substrate 5. The vibrator 2 is preferably formed by laminating second main surfaces of the piezoelectric substrates 3 and 5, with an electrode 7 therebetween. In this case, the polarizing directions of the piezoelectric substrates 3 and 5 are opposite. The first main surface of the piezoelectric substrate 3 and the first main surface of the piezoelectric substrate 5 respectively define first and second main surfaces of the vibrator 2. The widthwise direction, the longitudinal direction, and the thickness direction of the vibrator 2 are preferably substantially equal to those of the piezoelectric substrates 3 and 5. Each of the electrodes 4a and 4b is longitudinally divided into three areas, such as a main area, a first end area, and a second end area. The electrodes 6 and 7 are not divided, and are disposed on the entire surface of the corresponding piezoelectric substrates.

In the vibrator 2, since the piezoelectric substrates 3 and 5 have the same thickness, the facing surfaces of the piezoelectric substrates 3 and 5, i.e., the surfaces on which the electrode 7 is disposed, are substantially parallel to the first and second main surfaces of the vibrator 2 and are positioned at the approximate center of the vibrator 2 in the thickness direction. In the present invention, the plane extending from and passing through the above-described facing surfaces, is defined as the "neutral plane". The neutral plane includes two node points of the vibrator 2. Since the piezoelectric substrates 3 and 5 have substantially the same thickness, the potential of the electrode 7 becomes zero volts, i.e., neutral, when an AC voltage is applied between the first and second main surfaces of the vibrator 2. The "neutral plane" also means that the length of the neutral plane does not change while the vibrator 2 is performing a bending vibration in the thickness direction by being driven. However, if the thickness of the piezoelectric substrate 3 is different from that of the piezoelectric substrate 5, the surfaces on which the electrode 7 is disposed do not become a neutral plane. Thus, in the present invention, it is defined that the plane that is substantially parallel to the first and second main surfaces of the vibrator 2 and positioned at the approximate center of the vibrator 2 in the thickness direction is the "neutral plane".

The vibrator 2 performs a double-end-free bending vibration in the thickness direction by a drive signal applied to the electrodes 4a and 4b or the electrode 6. In this case, two axes disposed at positions of about 0.224 times the length of the vibrator 2 from the two ends of the vibrator 2 and passing through the width of the vibrator 2 at the approximate center of the vibrator 2 in the thickness direction (i.e., the position of the electrode 7) are indicated by n1 and n2. According to the above-described definition of the neutral plane, both the node axes n1 and n2 are positioned on the neutral plane.

The node axes of the vibrator 2 include not only the node axes of the vibration in the thickness direction generated by being driven, but also node axes of the vibration in the widthwise direction generated by the Coriolis force. In the present invention, the node axes n1 and n2 indicate the first type of axes, i.e., the node axes of the vibration in the thickness direction. The node points in the present invention represent intersections between the node axes of the vibration in the thickness direction and the node axes of the vibration in the widthwise direction generated by the Coriolis force.

The supporting member 8 is mechanically fixed preferably by soldering or with a conductive adhesive and is electrically fixed to the electrodes 4a and 4b disposed on the first main surface of the vibrator 2 in the vicinity of the node axis n1. The supporting member 10 is also mechanically and electrically fixed to the electrode 6 disposed on the second main surface of the vibrator 2 in the vicinity of the node axis n1. Similarly, the supporting member 9 is mechanically and electrically fixed to the electrodes 4a and 4b in the vicinity of the node axis n2, and the supporting member 11 is mechanically and electrically fixed to the electrode 6 in the vicinity of the node axis n2. More specifically, the supporting member 8 is fixed to the edge of the main area of the electrode 4a and the first end area of the electrode 4b. The supporting member 9 is fixed to the edge of the second end area of the electrode 4a and the edge of the main area of the electrode 4b. As a result, the supporting members 8 and 9 are electrically insulated from each other, and are also used as lead wires for the main areas of the electrodes 4a and 4b, respectively. The supporting members 10 and 11 are connected to the electrode 6 and are used as lead wires for the electrode 6.

The configuration of the supporting member 8 is as follows. The supporting member 8 first extends along the width of the vibrator 2 in the opposite directions from the portions fixed to the electrodes 4a and 4b, and then bends toward a first end of the vibrator 2. The supporting member 8 then bends in the thickness direction of the vibrator 2 (toward the supporting base 12) to reach the neutral plane, then bends toward the first end of the vibrator 2, and bends along the width of the vibrator 2. The supporting member 8 further bends toward a second end of the vibrator 2, then bends in the thickness direction of the vibrator 2 (toward the supporting base 12) to reach the supporting base 12, and is fixed thereto. The portions of the supporting member 8 positioned on the neutral plane are referred to as "intermediate portions" 8a.

The configuration of the supporting member 9 is as follows. The supporting member 9 first extends along the width of the vibrator 2 in the opposite directions from the portions fixed to the electrodes 4a and 4b, and then bends toward the second end of the vibrator 2. The supporting member 9 then bends in the thickness direction of the vibrator 2 (toward the supporting base 12) to reach the neutral plane, then bends toward the second end of the vibrator 2, and bends along the width of the vibrator 2. The supporting member 9 further bends toward the first end of the vibrator 2, then bends in the thickness direction of the vibrator 2 (toward the supporting base 12) to reach the supporting base 12, and is fixed thereto. The portions of the supporting member 9 positioned on the neutral plane are referred to as "intermediate portions" 9a.

The configuration of the supporting member 10 is as follows. The supporting member 10 first extends along the width of the vibrator 2 in the opposite directions from the portions fixed to the electrode 6, and then bends toward the second end of the vibrator 2. The supporting member 10 then bends in the thickness direction of the vibrator 2 (away from the supporting base 12) to reach the neutral plane, then bends toward the second end of the vibrator 2, and bends along the width of the vibrator 2. The supporting member 9 further bends toward the first end of the vibrator 2, then bends in the thickness direction of the vibrator 2 (toward the supporting base 12) to reach the supporting base 12, and is fixed thereto. The portions of the supporting member 10 positioned on the neutral plane are referred to as "intermediate portions" 10a.

The configuration of the supporting member 11 is as follows. The supporting member 11 first extends along the width of the vibrator 2 in the opposite directions from the portions fixed to the electrode 6, and then bends toward the first end of the vibrator 2. The supporting member 11 then bends in the thickness direction of the vibrator 2 (away from the supporting base 12) to reach the neutral plane, then bends toward the first end of the vibrator 2, and bends along the width of the vibrator 2. The supporting member 11 further bends toward the second end of the vibrator 2, then bends in the thickness direction of the vibrator 2 (toward the supporting base 12) to reach the supporting base 12, and is fixed thereto. The portions of the supporting member 11 positioned on the neutral plane are referred to as "intermediate portions" 11a.

In the vibrating gyroscope 1 shown in FIGS. 1 through 2C, a driver for bend-vibrating the vibrator 2 and an angular-velocity detector for detecting the angular velocity applied to the vibrator 2 from a signal output from the vibrator 2 are provided on the supporting base 12, and are connected to the electrodes of the vibrator 2 via the supporting members 8, 9, 10, and 11. The driver and the detector are not shown in the drawings. The supporting base 12 may be used merely for supporting the vibrator 2, and a circuit substrate may be separately provided.

In the vibrating gyroscope 1 configured as described above, the intermediate portions 8a, 9a, 10a, and 11a of the supporting members 8, 9, 10, and 11, respectively, are disposed on the neutral plane. Accordingly, the intermediate portions 8a and 10a are positioned in proximity with the node axis n1, while the intermediate portions 9a and 11a are positioned in proximity with the node axis n2. With this configuration, leakage of the vibration of the vibrator 2 to the exterior is reliably prevented, and the vibration becomes stable, thereby improving the detection precision of the angular velocity.

Each of the intermediate portions 8a, 9a, 10a, and 11a preferably includes a so-called "bending portion" having two sections arranged substantially parallel to the longitudinal direction of the vibrator 2 and one section along the width of the vibrator 2 for connecting the two sections. This bending portion functions as a buffer. By virtue of the presence of the bending portions, the supporting members 8, 9, 10, and 11 do not impede the vibration in the widthwise direction of the vibrator 2. Additionally, since the bending portions are positioned on the neutral plane, they do not impede the vibration in the thickness direction of the vibrator 2. Thus, leakage of the vibration of the vibrator 2 to the exterior is reliably prevented, which would otherwise make the vibration unstable, and decrease the detection precision of the angular velocity.

The bending portions of the supporting members 8 and 10 provided on both sides in the thickness direction in the vicinity of one of the node points bend in the opposite directions with respect to the longitudinal direction of the vibrator 2. The bending portions of the supporting members 9 and 11 provided on both sides in the thickness direction in the vicinity of the other node point also bend in the opposite directions with respect to the longitudinal direction of the vibrator 2. Thus, the bending portions of the supporting members are arranged to sandwich each node point in the thickness direction of the vibrator 2, and are also arranged to bend in the opposite directions along the longitudinal direction of the vibrator 2. Conventionally, while a vibrator is undergoing bending vibration in the thickness direction, node points may move due to a change in the center of gravity of the supporting members, thereby impeding the vibration of the vibrator. In contrast, according to the configuration of the vibrator 2 of this preferred embodiment, it is possible to prevent the supporting members from interfering with the vibration of the vibrator 2.

The bending portions of the supporting members 8 and 9 provided on one side of the thickness direction in the vicinity of the two node points bend in the opposite directions with respect to the longitudinal direction of the vibrator 2. The bending portions of the supporting member 10 and 11 provided on the other side of the thickness direction in the vicinity of the node points bend in the opposite directions in the vicinity of the longitudinal direction of the vibrator 2. Thus, the supporting members on one side of the thickness direction for the two node points and the supporting members on the other side of the thickness direction for the two node points bend in the opposite direction with respect to the longitudinal direction of the vibrator 2. It is thus possible to prevent the supporting members from impeding the vibration of the vibrator 2.

Figure 3:
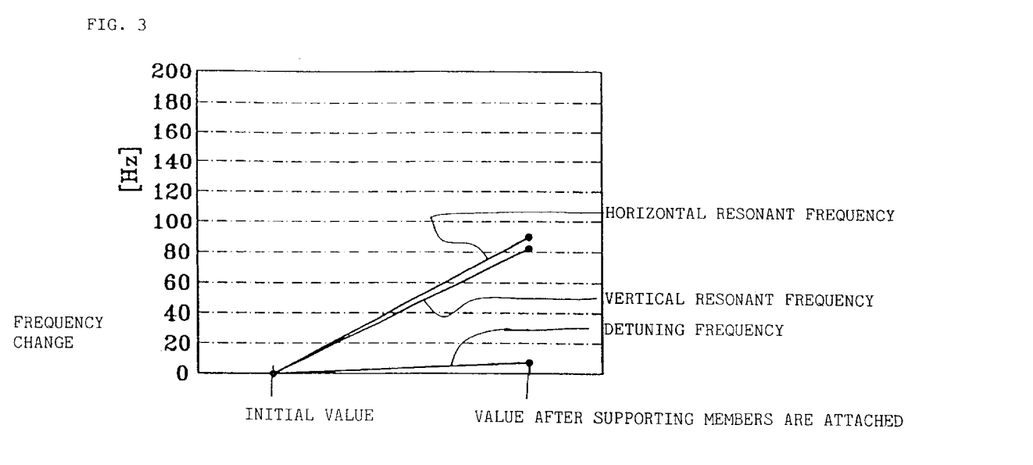
FIG. 3 is a characteristic diagram illustrating the change in resonant frequency of a vibrator for use in the vibrating gyroscope shown in FIG. 1 before and after supporting members are attached.

FIG. 3 illustrates the change in resonant frequency of the vibrator 2 of the vibrating gyroscope 1 of this preferred embodiment before and after attaching the supporting members 8 through 11. FIG. 3 shows that the change in vertical resonant frequency is substantially equal to the change in horizontal resonant frequency caused by the attachment of the supporting members 8 through 11, and thus, the detuning frequency remains almost the same. Accordingly, even if such a change is canceled by external disturbances, such as a mechanical or thermal impact, the detuning frequency still remains almost the same. As a result, the sensitivity, the temperature characteristics, and the response characteristics can be substantially maintained.

As discussed above, in the vibrating gyroscope 1, since the vibration of the vibrator 2 does not leak to the exterior via the supporting members, the vibration of the vibrator 2 becomes stable, thereby improving the detection precision of the angular velocity. Additionally, the change in detuning frequency before and after attaching the supporting members to the vibrator 2 is small. Thus, the sensitivity for detecting the Coriolis force, the temperature characteristics, and the response characteristics do not change over time.

Figure 4:
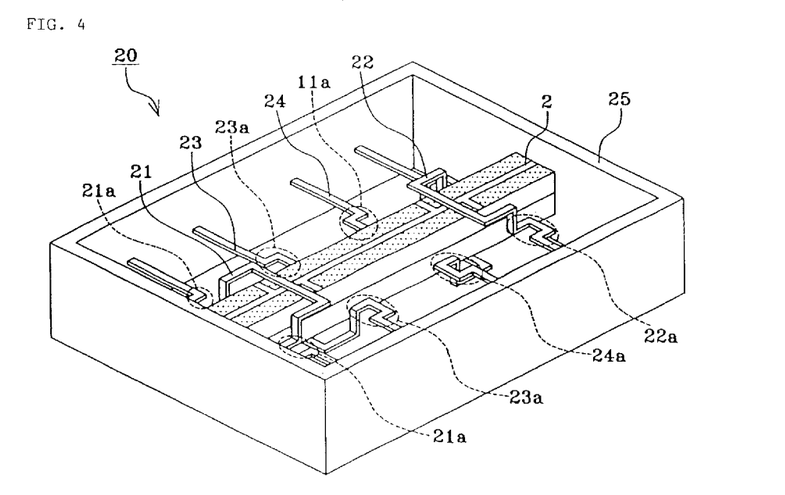
FIG. 4 is a perspective view illustrating a vibrating gyroscope according to another preferred embodiment of the present invention.

FIG. 4 is a perspective view illustrating a vibrating gyroscope according to another preferred embodiment of the present invention. In FIG. 4, the components that are the same as or similar to those in FIG. 1 are designated with like reference numerals, and an explanation thereof is thus omitted.

A vibrating gyroscope 20 shown in FIG. 4 includes a vibrator 2, planar conductive supporting members 21, 22, 23, and 24 preferably made of metal, for example, a Fe—Ni alloy or phosphorus bronze, a resin vibrator base 25 which preferably has an open-box-type configuration.

The supporting members 21 and 23 are mechanically fixed preferably by soldering or with a conductive adhesive and are electrically fixed to the first and second main surfaces, respectively, of the vibrator 2 in the vicinity of one node point. Similarly, the supporting members 22 and 24 are mechanically and electrically fixed to the first and second main surfaces, respectively, of the vibrator 2 in the vicinity of the other node point. The supporting members 21 and 23 are electrically insulated from each other, and are also used as lead wires for two electrodes disposed on the first main surface of the vibrator 2. The supporting members 22 and 24 are connected to a single electrode disposed on the second main surface of the vibrator 2 and are also used as lead wires for that electrode.

The configuration of the supporting member 21 is as follows. The supporting member 21 first extends along the width of the vibrator 2 in the opposite directions from the portions fixed to the vibrator 2, and then bends toward the first end of the vibrator 2. The supporting member 21 then bends in the thickness direction of the vibrator 2 (downward) to reach the neutral plane, then bends toward the first end of the vibrator 2, and bends along the width of the vibrator 2. The supporting member 21 bends toward the second end of the second end of the vibrator 2, then bends along the width of the vibrator 2 to reach one side wall of the vibrator base 25, and is fixed thereto. The portions of the supporting member 21 positioned on the neutral plane are referred to as "intermediate portions" 21a.

The configuration of the supporting member 22 is as follows. The supporting member 22 first extends along the width of the vibrator 2 in the opposite directions from the portions fixed to the vibrator 2, and then bends toward the second end of the vibrator 2. The supporting member 22 then bends in the thickness direction of the vibrator 2 (downward) to reach the neutral plane, then bends toward the second end of the vibrator 2, and bends along the width of the vibrator 2. The supporting member 22 bends toward the first end of the vibrator 2, then bends along the width of the vibrator 2 to reach one side wall of the vibrator base 25, and is fixed thereto. The portions of the supporting member 22 positioned on the neutral plane are referred to as "intermediate portions" 22a.

The configuration of the supporting member 23 is as follows. The supporting member 23 first extends along the width of the vibrator 2 in the opposite directions from the portions fixed to the vibrator 2, and then bends toward the second end of the vibrator 2. The supporting member 23 then bends in the thickness direction of the vibrator 2 (upward) to reach the neutral plane, then bends toward the second end of the vibrator 2, and bends along the width of the vibrator 2. The supporting member 23 bends toward the first end of the vibrator 2, then bends along the width of the vibrator 2 to reach the vibrator base 25, and is fixed thereto. The portions of the supporting member 23 positioned on the neutral plane are referred to as "intermediate portions" 23a.

The configuration of the supporting member 24 is as follows. The supporting member 24 first extends along the width of the vibrator 2 in the opposite directions from the portions fixed to the vibrator 2, and then bends toward the first end of the vibrator 2. The supporting member 24 then bends in the thickness direction of the vibrator 2 (upward) to reach the neutral plane, then bends toward the first end of the vibrator 2, and bends along the width of the vibrator 2. The supporting member 24 bends toward the second end of the vibrator 2, then bends along the width of the vibrator 2 to reach the vibrator base 25, and is fixed thereto. The portions of the supporting member 24 positioned on the neutral plane are referred to as "intermediate portions" 24a.

In the vibrating gyroscope 20 shown in FIG. 4, a driver for bend-vibrating the vibrator 2 and an angular-velocity detector for detecting the angular velocity applied to the vibrator 2 from a signal output from the vibrator 2 are preferably disposed on a circuit board, which is separately provided from the vibrating gyroscope 20, and are connected to the electrodes of the vibrator 2 via the supporting members 21, 22, 23, and 24. Such a driver and a detector are not shown in the drawings.

In the vibrating gyroscope 20 having the configuration described above, the intermediate portions 21a, 22a, 23a, and 24a of the supporting members 21, 22, 23, and 24, respectively, are positioned on the neutral plane. Accordingly, the intermediate portions 21a and 23a are positioned in close proximity with one node axis, while the intermediate portions 22a and 24a are positioned in close proximity with the other node axis. Thus, leakage of the vibration of the vibrator 2 to the exterior is decreased, and the vibration becomes stable, thereby improving the detection precision of the angular velocity.

Each of the intermediate portions 21a, 22a, 23a, and 24a includes a so-called "bending portion" having two sections that are substantially parallel to the longitudinal direction of the vibrator 2 and one section extending along the width of the vibrator 2 for connecting the two sections. This bending portion functions as a buffer. By virtue of the presence of the bending portions, which function as buffers, the supporting members 21, 22, 23, and 24 do not impede the vibration in the widthwise direction of the vibrator 2. Additionally, since the bending portions are positioned on the neutral plane, they do not impede the vibration in the thickness direction of the vibrator 2.

As described above, in the vibrating gyroscope 20, leakage of the vibration of the vibrator 2 to the exterior via the supporting members is minimized, and thus, the vibration of the vibrator 2 becomes much more stable, thereby greatly improving the detection precision of the angular velocity. Although data is not given, the change in detuning frequency before and after attaching the supporting members is smaller, as in the vibrating gyroscope 1. It is thus possible to decrease the variation in the detection precision of the angular velocity.

In the foregoing preferred embodiments, the approximate central portions of the supporting members are fixed to the vibrator 2, and are extended in the opposite directions along the width of the vibrator 2. That is, the supporting member located on one side of the width of the vibrator 2 is integral with the supporting member located on the other side of the width of the vibrator 2. However, the supporting members be formed separately, and one end of each supporting member on either side may be fixed to the vibrator 2. In this case, advantages similar to those obtained by the vibrator 2 having the supporting members integrated to each other can be achieved.

Additionally, in the above-described preferred embodiments, the bending portions are preferably provided at the middle of the supporting members. However, without bending portions, or by providing bending portions at positions other than the middle of the supporting members, advantages similar to those obtained by the preferred embodiments of the present invention can be achieved. That is, leakage of the vibration of the vibrator to the exterior can be decreased. Thus, as in the vibrating gyroscopes 1 and 20, the vibration becomes stable, and the detection precision of the angular velocity is greatly improved.

In the above-described preferred embodiments, the supporting members are preferably conductive. However, the supporting members may not possess conductivity as long as connection members for connecting the supporting members to the electrodes of the vibrator are provided.

In the aforementioned preferred embodiments, the vibrator has the first and second main surfaces extending in the thickness direction. However, the vibrator is not restricted to the configuration disclosed in the foregoing preferred embodiments, such as a vibrator having first and second main surfaces, and may be a prismatic or cylindrical vibrator.

Figure 5:
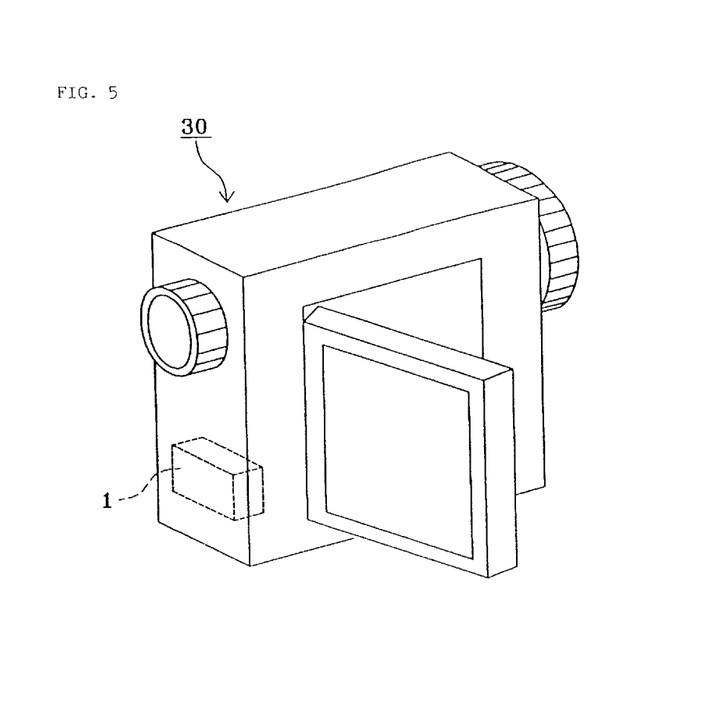
FIG. 5 is a perspective view illustrating an electronic unit according to a further preferred embodiment of the present invention.

FIG. 5 is a perspective view illustrating a video camera, which defines an electronic unit, according to a further preferred embodiment of the present invention. In FIG. 5, a video camera 30 includes the vibrating gyroscope 1 of the present invention as a hand-shaking correction device.

In this video camera 30, high-precision angular velocity information can be obtained, and the performance of the video camera 30 can be improved.

The electronic unit of various preferred embodiments of the present invention includes not only a video camera, but also all types of electronic units using a vibrating gyroscope, such as a digital camera using a vibrating gyroscope as a hand-shaking correction device, a navigation system using a vibrating gyroscope as a position detecting device, and a system for detecting when an automobile has turned over onto its side.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A vibrating gyroscope comprising:
   a bar-shaped vibrator generating double-end-free bending vibration in the thickness direction and in the widthwise direction of the bar-shaped vibrator; and
   supporting members arranged to sandwich vicinities of two node points of said vibrator from both sides of said vibrator in the thickness direction; wherein
   said supporting members are arranged such that they extend from positions at which they are fixed to said vibrator in the widthwise direction of said vibrator, and also include intermediate portions positioned substantially on a plane which is substantially parallel to the widthwise direction and the longitudinal direction of said vibrator and which is aligned at and passes through the approximate center of said vibrator in the thickness direction.

2. A vibrating gyroscope according to claim 1, wherein said supporting members are extended to both sides in the widthwise direction of said vibrator so as to define the intermediate portions.

3. A vibrating gyroscope according to claim 1, wherein said supporting member includes at least one bending portion located at the position of the intermediate portion.

4. A vibrating gyroscope according to claim 3, wherein the bending portions of said supporting members positioned on both sides of said vibrator in the thickness direction in the vicinity of each of the node points bend in the opposite directions with respect to the longitudinal direction of said vibrator.

5. A vibrating gyroscope according to claim 3, wherein the bending portions of said supporting members positioned on one side of said vibrator in the thickness direction in the vicinities of the two node points bend in the opposite directions with respect to the longitudinal direction of said vibrator, and the bending portions of said supporting members positioned on the other side of said vibrator in the thickness direction in the vicinities of the two node points bend in the opposite directions with respect to the longitudinal direction of said vibrator.

6. A vibrating gyroscope according to claim 1, wherein said supporting members are made of a conductive material, and are electrically and mechanically connected to electrodes disposed on said vibrator.

7. A vibrating gyroscope according to claim 6, wherein said vibrator comprises a first main surface and a second main surface in the thickness direction, and the electrodes are disposed on the first main surface and the second main surface.

8. A vibrating gyroscope according to claim 1, further comprising a supporting base, wherein ends of said supporting members are bent toward one side of said vibrator in the thickness direction and are fixed on said supporting base, thereby retaining said vibrator in a space above said supporting base.

9. A vibrating gyroscope according to claim 1, further comprising an opened-box-shaped base having side wails and having a hollowed out portion at the approximate center thereof, wherein ends of said supporting members are fixed to said opened-box-shaped base so as to retain said vibrator in the hollowed out portion of said opened-box-shaped base.

10. A vibrating gyroscope according to claim 1, wherein the vibrator includes piezoelectric substrates polarized in the thickness direction thereof.

11. A vibrating gyroscope according to claim 10, wherein the piezoelectric substrates are polarized in opposite directions.

12. A vibrating gyroscope according to claim 10, wherein one of the piezoelectric substrates includes electrodes being disposed thereon and longitudinally divided into three areas, and another of the piezoelectric substrates includes an electrode disposed on the entire surface thereof.

13. A vibrating gyroscope according to claim 1, wherein the supporting members include bending portions which are arranged to sandwich each node point in the thickness direction of the vibrator, and are arranged to bend in the opposite directions along the longitudinal direction of the vibrator.

14. A vibrating gyroscope according to claim 1, wherein at least one of the supporting members located on one side of the thickness direction of the vibrator and at least one of the supporting members on the other side of the thickness direction of the vibrator bend in opposite directions with respect to the longitudinal direction of the vibrator.

15. A vibrating gyroscope according to claim 1, further comprising a resin vibrator base which has an open-box-type configuration and supports the vibrator.

16. A vibrating gyroscope according to claim 1, wherein the supporting members are mechanically fixed and electrically fixed to the vibrator in the vicinity of the node points.

17. A vibrating gyroscope according to claim 1, wherein approximate central portions of the supporting members are fixed to the vibrator.

18. A vibrating gyroscope according to claim 1, wherein the supporting members include bending portions located at the middle of the supporting members.

19. An electronic unit comprising the vibrating gyroscope according to claim 1.

20. An electronic unit according to claim 19, wherein the electronic unit is one of a video camera, a digital camera, a navigation system and a system for detecting when an automobile has turned over onto its side.

* * * * *